(12) United States Patent
Honda

(10) Patent No.: US 8,401,734 B2
(45) Date of Patent: Mar. 19, 2013

(54) OPERATION ASSISTING SYSTEM AND DRIVING FORCE CONTROLLING SYSTEM

(75) Inventor: Tomoyuki Honda, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 521 days.

(21) Appl. No.: 12/673,116

(22) PCT Filed: Aug. 8, 2008

(86) PCT No.: PCT/JP2008/064276
§ 371 (c)(1),
(2), (4) Date: Feb. 11, 2010

(87) PCT Pub. No.: WO2009/022637
PCT Pub. Date: Feb. 19, 2009

(65) Prior Publication Data
US 2010/0204883 A1    Aug. 12, 2010

(30) Foreign Application Priority Data

Aug. 10, 2007 (JP) .................................. 2007-210286

(51) Int. Cl.
*G06F 7/00* (2006.01)
(52) U.S. Cl. ............................................ 701/36; 701/70
(58) Field of Classification Search .................... 701/36, 701/70, 301, 93, 96; 180/167, 170, 169; 340/435, 436
See application file for complete search history.

(56) References Cited

U.S. PATENT DOCUMENTS

| 7,124,010 B2* | 10/2006 | Egami ............................. 701/93 |
| 7,228,233 B2* | 6/2007 | Kimura et al. ................. 701/301 |
| 7,295,908 B2 | 11/2007 | Goto et al. |
| 7,715,972 B2* | 5/2010 | Kuge ............................... 701/96 |
| 2003/0135317 A1 | 7/2003 | Hijikata et al. |
| 2008/0251312 A1 | 10/2008 | Goto et al. |

FOREIGN PATENT DOCUMENTS

| DE | 10 2007 016 615 A1 | 10/2007 |
| EP | 1 548 314 A2 | 6/2005 |
| JP | 2-31947 | 2/1990 |
| JP | 5 231194 | 9/1993 |
| JP | 6 146951 | 5/1994 |
| JP | 2000-205015 | 7/2000 |

(Continued)

OTHER PUBLICATIONS

Office Action issued Feb. 15, 2011, in Japan Patent Application No. 2007-210286.

*Primary Examiner* — Richard M. Camby
(74) *Attorney, Agent, or Firm* — Oblon, Spivak, McClelland, Maier & Neustadt, L.L.P.

(57) ABSTRACT

An operation assisting system, which is capable of adjusting an operational feeling to operate an operating device to an actual resultant physical quantity, thereby mitigating uncomfortable feeling of the driver. The operation assisting system includes a drive unit for generating a power for driving a vehicle, an operating device for controlling the power transmitted from the drive unit to a wheel of the vehicle, a reaction force generating mechanism for generating a reaction force against the operated operating device, and a reaction force controller for controlling the reaction force generated by the reaction force generating mechanism exponentially, with respect to a change in a force applied to the operating device to operate the operating device, a change in an operating amount of the operating device, or a velocity to operate the operating device.

4 Claims, 8 Drawing Sheets

FOREIGN PATENT DOCUMENTS

| | | |
|---|---|---|
| JP | 2003 205760 | 7/2003 |
| JP | 2003-293798 | 10/2003 |
| JP | 2004-9932 | 1/2004 |
| JP | 2004 182200 | 7/2004 |
| JP | 2004-276669 | 10/2004 |
| JP | 2005-193783 | 7/2005 |
| JP | 2005-199955 | 7/2005 |
| JP | 2006 7843 | 1/2006 |
| JP | 2006-117088 | 5/2006 |
| JP | 2006-200526 | 8/2006 |
| JP | 3911001 B1 | 5/2007 |

* cited by examiner

OPERATION ASSISTING SYSTEM AND DRIVING FORCE CONTROLLING SYSTEM

TECHNICAL FIELD

This invention relates to an operation assisting system and a driving force controlling system, in which propulsion for driving a vehicle is controlled by a driver by operating an operating device.

BACKGROUND ART

In general, a vehicle is provided with an operating device to be operated by a driver, an electronic control unit for determining a target driving force of the vehicle on the basis of an operating condition of the operating device and stored data, and a drive unit adapted to generate a driving force for running the vehicle in accordance with the target driving force. An example of a vehicle in which a drive unit is controlled by an electronic control unit, that is, an example of a control device of a vehicle is disclosed by Japanese Patent Laid-Open No. 6-146951. According to the throttle valve control device of engine taught by Japanese Patent Laid-Open No. 6-146951, an engine is provided with a supercharger, an air intake passage, and an exhaust passage, and a throttle valve is arranged on the exhaust passage. An actuator is actuated in accordance with a control signal from a control unit to open and close the throttle valve. Meanwhile, a signal representing an operation quantity of an accelerator, a signal representing an engine speed, a signal representing an engine load and so on are inputted to the control unit. Accordingly, an opening degree of the throttle valve is controlled according to the engine speed, the engine load, and the operation quantity of the accelerator. For this purpose, according to the teachings of Japanese Patent Laid-Open No. 6-146951, five kinds of characteristic lines are prepared, and a value obtained by dividing a percentage of the throttle opening by a percentage of the operating quantity is different in each characteristic line. That is, the opening degree of the throttle valve is controlled by selecting one of those characteristic lines in accordance with the engine speed and the engine load. In addition, Japanese Patent Laid-Open No. 2004-182200 also discloses an invention relating to a drive unit of a vehicle.

However, according to the throttle valve control device of engine taught by Japanese Patent Laid-Open No. 6-146951, the five kinds of characteristic lines are prepared in advance in accordance with driving conditions of the vehicle, as described above. Therefore, in case of changing the characteristic line, an actual acceleration of the vehicle may be different from an expected acceleration of the driver. For this reason, the driver may feel an uncomfortable feeling about the acceleration of the vehicle.

DISCLOSURE OF THE INVENTION

An object of the present invention is to provide an operation assisting system and a driving force controlling system capable of mitigating uncomfortable feeling relating to an operation of the operating device of a vehicle.

In order to achieve the above-mentioned object, according to the present invention, there is provided an operation assisting system, which has a drive unit for generating a driving force for driving a vehicle, an operating device operated by a driver of the vehicle to control the driving force, and a reaction force generating mechanism for generating a reaction force against the operated operating device, characterized in that: the reaction force generating mechanism is adapted to vary the reaction force exponentially, with respect to a change in a force applied to the operating device to operate the operating device, a change in an operating amount of the operating device, or a velocity to operate the operating device.

According to another aspect of the present invention, there is provided a driving force controlling system, which has a drive unit for generating a driving force for driving a vehicle, an operating device operated by a driver of the vehicle, a target driving force determining device for determining a target driving force of the vehicle on the basis of a change in a force applied to the operating device to operate the operating device, a change in an operating amount of the operating device, or a velocity to operate the operating device, and a controller for controlling the driving force generated by the drive unit on the basis of the determined target drive force, characterized by comprising: a target drive force calculating means for varying the target drive force determined by the target drive force determining device exponentially, with respect to the change in the force applied to the operating device to operate the operating device, the change in the operating amount of the operating device, or the velocity to operate the operating device.

According to the present invention, the target driving force calculating means includes a means which is adapted to vary the target driving force using different exponent functions depending on a situation, between a case in which the force applied to the operating device to operate the operating device is being increased, and a case in which the force applied to the operating device to operate the operating device is being decreased.

According to the present invention, the target driving force calculating means includes a means which is adapted to vary the target driving force using different exponent functions depending on a situation, between a case in which the operating amount of the operating device is being increased, and a case in which the operating amount of the operating device is being decreased.

According to the present invention, the target driving force calculating means includes a means which is adapted to vary the target driving force using different exponent functions depending on a situation, between a case in which the velocity to operate the operating device is relatively high, and a case in which the velocity to operate the operating device is relatively low.

According to still another aspect of the present invention, there is provided a driving force controlling system, which has a drive unit for generating a driving force for driving a vehicle, an operating device operated by a driver of the vehicle, a target driving force determining device for determining a target driving force of the vehicle on the basis of a change in a force applied to the operating device to operate the operating device, a change in an operating amount of the operating device, or a velocity to operate the operating device, a controller for controlling the driving force generated by the drive unit on the basis of the determined target driving force, and a reaction force generating mechanism for generating a reaction force against the operated operating device, characterized by comprising: a target driving force calculating means for varying the target driving force determined by the target driving force determining device exponentially, with respect to the change in the force applied to the operating device to operate the operating device, the change in the operating amount of the operating device, or the velocity to operate the operating device; and a reaction force control means for varying the reaction force generated by the reaction force generating mechanism exponentially, with respect to the change in the force applied to the operating device to operate the operating device, the change in the operating amount of the operating device, or the velocity to operate the operating device.

According to the operation assisting system of the present invention, therefore, the driving force of the drive unit is controlled by the driver by controlling the operating device, and a reaction force against the operated operating device is generated by the reaction force generating mechanism. In addition, the reaction force generated by the reaction force generating mechanism is varied exponentially with respect to a change in a force applied to the operating device to operate the operating device, a change in an operating amount of the operating device, or the velocity to operate the operating device. That is, the reaction force generated by the reaction force generating mechanism can be varied in line with the driver's own perceptional characteristics, with respect to the change in the force applied to the operating device to operate the operating device, the change in the operating amount of the operating device, or the velocity to operate the operating device. Consequently, an actual operational feeling of the driver to operate the operating device can be adjusted to an expected operational feeling of the driver to operate the operating device. Therefore, the driver can be prevented from feeling uncomfortable feeling in relation to the operation of the operating device.

Meanwhile, according to the driving force controlling system of the present invention, the target driving force of the vehicle is also determined when the driver operates the operating device, and the driving force generated by the drive unit is controlled on the basis of the determined target driving force. In addition, the target driving force determined by the target driving force determining device is varied exponentially with respect to a change in a force applied to the operating device to operate the operating device, a change in an operating amount of the operating device, or the velocity to operate the operating device. That is, the driving force for driving the vehicle can be varied in line with the driver's own perceptional characteristics, with respect to the change in a force applied to the operating device to operate the operating device, the change in the operating amount of the operating device, or the velocity to operate the operating device. Consequently, an actual acceleration of the vehicle can be adjusted to an expected acceleration of the driver. Therefore, the driver can be prevented from feeling uncomfortable feeling in relation to the operation of the operating device.

In addition to the above advantages, according to the present invention, the target driving force can be controlled using different exponent functions depending on the situation, between a case in which the force applied to the operating device to operate the operating device is being increased, and a case in which the force applied to the operating device to operate the operating device is being decreased. Therefore, the target driving force can be differentiated between a case in which an acceleration demand is being increased, and a case in which an acceleration demand is being decreased. For this reason, the driver can be certainly prevented from feeling uncomfortable feeling.

Alternatively, according to the present invention, the target driving force is controlled using different exponent functions depending on the situation, between a case in which the operating amount of the operating device is being increased, and a case in which the operating amount of the operating device is being decreased. Therefore, the target driving force can be differentiated between a case in which the acceleration demand is being increased and a case in which an acceleration demand is being decreased. For this reason, the driver can be certainly prevented from feeling uncomfortable feeling.

Instead, according to the present invention, the target driving force is controlled using different exponent functions depending on the situation, between a case in which the velocity to operate the operating device is high, and a case in which the velocity to operate the operating device is low. Therefore, the target driving force can be varied in accordance with an increase of the acceleration demand. For this reason, the driver can be certainly prevented from feeling uncomfortable feeling.

According to still another aspect of the present invention, the target driving force of the vehicle is also determined when the driver operates the operating device, and the driving force generated by the drive unit is controlled on the basis of the determined target driving force. In addition, when the operating device is operated, a reaction force against the operated operating device is generated, and the reaction force generated by the reaction force generating mechanism is controlled exponentially with respect to a change in a force applied to the operating device to operate the operating device, a change in an operating amount of the operating device, or the velocity to operate the operating device. Consequently, an actual operational feeling of the driver to operate the operating device can be adjusted to an expected operational feeling of the driver to operate the operating device. Therefore, the driver can be prevented from feeling uncomfortable feeling in relation to the operation of the operating device. Moreover, the target driving force can be controlled exponentially with respect to the change in a force applied to the operating device to operate the operating device, the change in an operating amount of the operating device, or the velocity to operate the operating device. For this reason, an actual acceleration of the vehicle can be adjusted to an expected acceleration of the driver. Therefore, the driver can be prevented from feeling uncomfortable feeling in relation to the operation of the operating device.

BEST MODE FOR CARRYING OUT THE INVENTION

Figure 1:
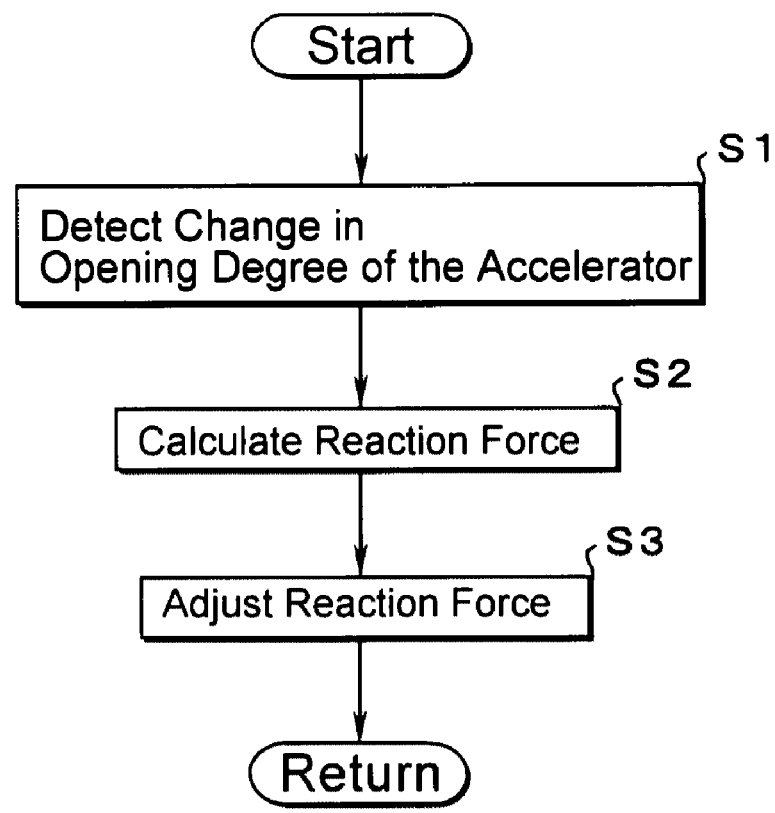
FIG. 1 is a flowchart showing a control example of the present invention to be carried out in a vehicle.

According to the present invention, a definition of the term "vehicle" is an object driven by a driving force generated by a drive unit. Specifically, the term vehicle includes a passenger car, a forklift, a cargo truck, a trailer, a bus and so on. According to the present invention, the vehicle is provided with an operating device which is to be operated by a driver, for example by a hand or a foot of the driver. That is, the operating device is adapted to be operated by a force applied thereto from the driver in a predetermined direction. Alternatively, the operating device may also be adapted not to be operated mechanically. For example, the operating device, which is adapted to be operated in a predetermined direction includes a lever, a pedal, a button, a knob and so on can be used as the operating device. Specifically, the operating device is adapted to be rotated or rotated within a predetermined degree when operated by the driver. Otherwise, the operating device is adapted to be pushed or pulled in a predetermined direction when operated by the driver. On the other hand, the operating device, which is not adapted to be operated mechanically includes a pressure-sensitive touch panel such as a liquid crystal panel, a sealed bag filled with liquid or gas, an operating device comprising a hydraulic chamber. In case the operating device adapted to be operated in a predetermined direction is used in the present invention, at least one of a force applied to the operating device to operate the operating device, an operating amount of the operating device, and a velocity to operate the operating device is detected or judged to control the power of the drive unit on the basis of the detection or judgment result. Here, according to the present invention, a definition of the expression "operating amount of the operating device" is an amount of a movement of the operating device. Specifically, in case the operating device is adapted to be rotated, an angle of rotation of the operating device is the operating amount of the operating device. Otherwise, in case the operating device is adapted to be pushed or pulled linearly, a linear moving distance of the operating device is the operating amount of the operating device. On the other hand, in case the operating device is not adapted to be operated mechanically, a force applied to the operating device is judged and the drive unit is controlled on the basis of the judgment result.

According to the present invention, the drive unit is adapted to generate a driving force for driving the vehicle. Specifically, in case the vehicle is a car for running on a ground, the driving force is transmitted to a wheel from the drive unit to drive the vehicle. Here, the drive unit includes a prime mover and a power transmission unit arranged on a route from the prime mover to the wheel. More specifically, the prime mover is a device adapted to generate a power, and the prime mover includes an engine, an electric motor, a hydraulic motor, a flywheel system and so on. As described, the power of the prime mover, that is, a torque and a rotational speed of the prime mover are controlled by operating the operating device. On the other hand, the power transmission unit is a device adapted to transmit the power generated by the prime mover to the wheel, and the power transmission unit includes a transmission, a fluid transmission unit and so on. A speed change ratio of the transmission, a torque capacity of the transmission, a torque capacity of the fluid transmission, a torque ratio of the fluid transmission and so on are also controlled by operating the operating device. According to the present invention, the reaction force generating mechanism is adapted to generate a reaction force against the force applied to the operating device to operate the operating device. Specifically, the reaction force generating mechanism is adapted to very the reaction force thereof with respect to a change in the force applied to the operating device to operate the operating device, a change in the operating amount of the operating device, or a velocity to operate the operating device. For example, in case the force applied to the operating device is increased, in case the operating amount of the operating device is increased, or in case the velocity to operate the operating device is high, the reaction force being established is increased or a greater reaction force is generated. To the contrary, in case the force applied to the operating device is decreased, in case the operating amount of the operating device is decreased, or in case the velocity to operate the operating device is low, the reaction force being established is decreased or a weaker reaction force is generated. According to the present invention, the terms "high" and "low" express a comparative relation between different speeds, and the terms "high" and "low" therefore do not represent any specific speed. Specifically, according to the present invention, the reaction force generated by the reaction force generating mechanism is increased in accordance with an increase of the velocity to operate the operating device, and decreased in accordance with a decrease of the velocity to operate the operating device.

According to the present invention, a mechanism, which is adapted to detect parameters of the force applied to the operating device, the operating amount of the operating device, and the velocity to operate the operating device, and which is adapted to control the reaction force on the basis of the detected parameters can be used as the reaction force generating mechanism. For example, in case of using the operating device adapted to be rotated or reciprocated in a predetermined direction, a mechanism for generating a reaction force by transmitting an elastic force of a spring to the operating device, a mechanism for generating a reaction force by transmitting a torque of an electric motor to the operating device, a mechanism for generating a reaction force by transmitting an oil pressure of a hydraulic cylinder to the operating device and so on can be used as the reaction force generating mechanism against the rotational movement or the linear movement of the operating device. Meanwhile, in case of using the operating device which is adapted not to be operated mechanically, the reaction force can be increased and decreased by varying a pressure of a fluid held in a sealed bag or a sealed hydraulic chamber by the reaction force generating mechanism. Specifically, the pressure of the fluid held in the sealed bag or the sealed hydraulic chamber can be controlled by using a pressure control valve. In addition, a change in the operating amount of the operating device, a change in the force applied to the operating device to operate the operating device, and a change in a reaction force can be expressed by a rate of change, a ratio of change, a gradient of change and so on. Further, according to the present invention, it is also possible to use a reaction force generating mechanism, which is adapted to vary a reaction force thereof in accordance with a mechanical characteristic or a physical characteristic, without detecting parameters of the force applied to the operating device, the operating amount of the operating device, and the velocity to operate the operating device.

Figure 2:
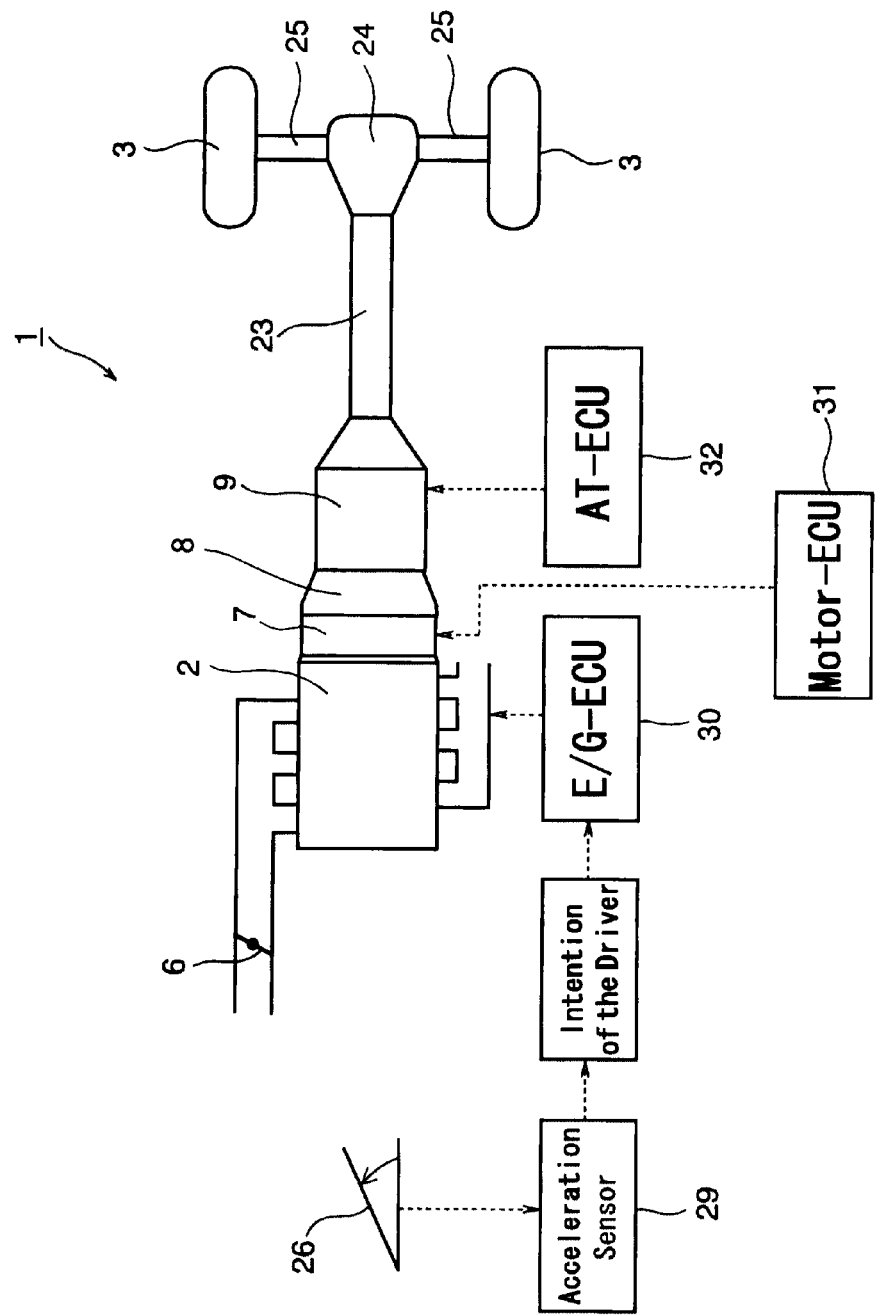
FIG. 2 is a conceptual diagram showing a vehicle feasible for carrying out the control of the present invention.
Figure 3:
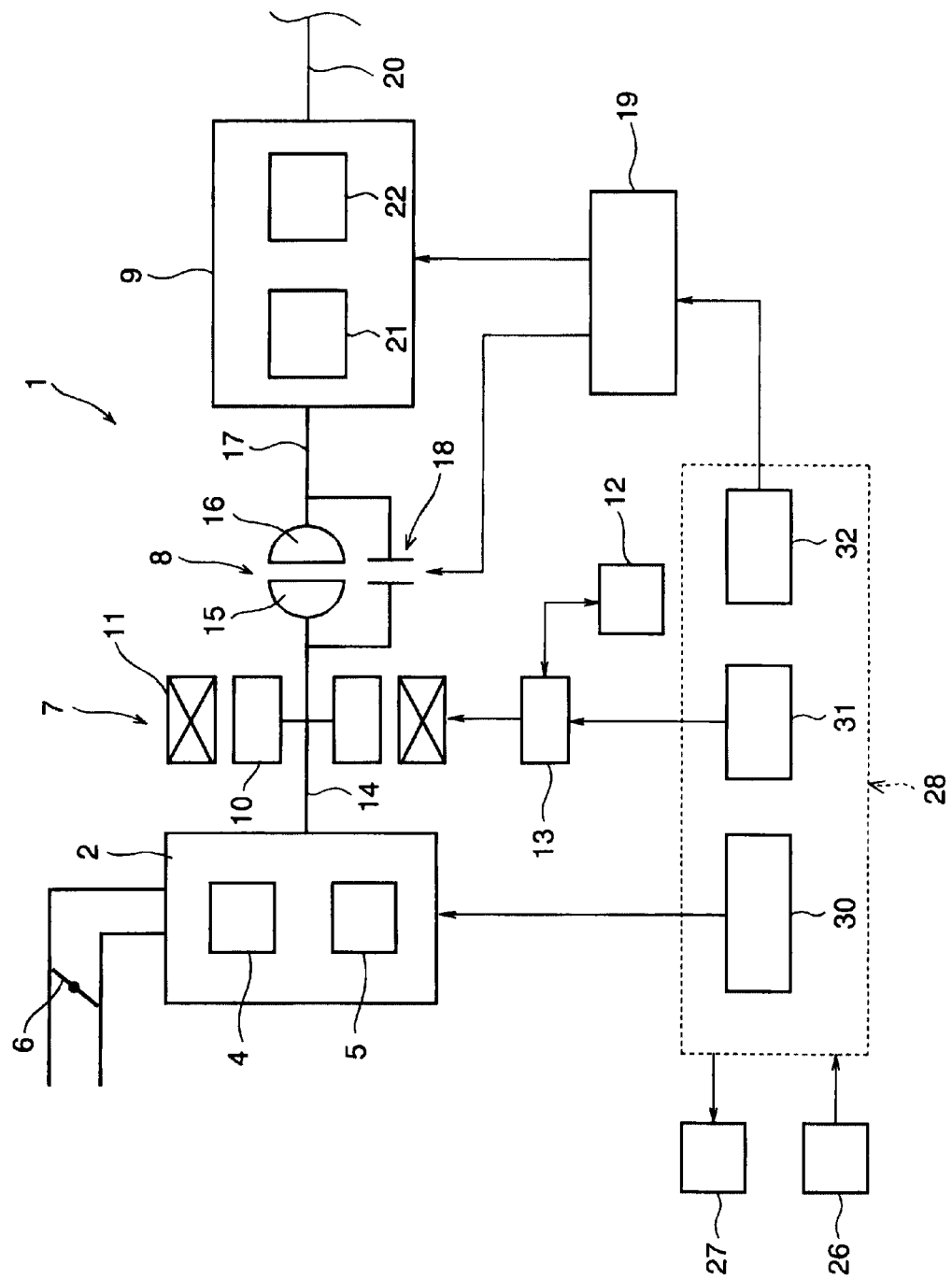
FIG. 3 is a conceptual diagram showing a power train of the vehicle shown in FIG. 2 more specifically.

Next, an example of the present invention will be explained with reference to the accompanying figures. First of all, a configuration of a vehicle such as a car will be explained hereinafter. FIG. 2 is a conceptual diagram showing a configuration of a power train and a control system of a vehicle 1 conceptually, and FIG. 3 is a conceptual diagram showing a power train of the vehicle 1 more specifically. As shown in FIGS. 2 and 3, the vehicle 1 is an FR type vehicle, that is, the vehicle 1 is a front engine and rear drive type vehicle, in which a power outputted from the engine 2 functioning as a prime mover is transmitted to the rear wheel 3. Specifically, the engine 2 is a power unit such as an internal combustion engine, which is adapted to output a power by converting thermal energy generated by burning a fuel into a kinetic energy. For example, a gasoline engine, a diesel engine, an LPG engine and so on can be used as the engine 2. In this example, a gasoline engine is used as the engine 2. That is, the engine 2 is a conventional internal combustion engine comprising a fuel injection device 4, an ignition timing control device 5, an electronic throttle valve 6 and so on. In the engine 2, an injection quantity of the fuel is controlled by the fuel injection device 4, an ignition timing is controlled by the ignition timing control device 5, and an air-intake is controlled by controlling an opening degree of the electronic throttle valve 6. Accordingly, an output of the engine 2 can be controlled by controlling one of the injection quantity of the fuel, the ignition timing, and the air-intake. Here, the output of the engine 2 can be obtained by multiplying a torque by a rotational speed thereof.

An electric motor 7, a hydraulic transmission mechanism 8, and a transmission 9 are arranged on a power transmission route from the engine 2 to the wheel 3. The electric motor 7 is a power unit adapted to output a power by converting an electric energy into a kinetic power, and both AC motor and DC motor can be used as the electric motor 7. In addition, a motor generator capable of functioning as a motor and a generator can also be used as the electric motor 7. Specifically, the electric motor 7 comprises a rotor 10 and a stator 11, and the rotor 10 is connected with a crank shaft 14 of the engine 2 in a power transmittable manner. Meanwhile, an electric storage device 12 is connected with the electric motor 7 through an inverter 13. The hydraulic transmission mechanism 8 is adapted to transmit a power between a pump impeller 15 and a turbine runner 16 by a kinetic energy of fluid. The pump impeller 15 is connected with the crank shaft 14 in a power transmittable manner, and the turbine runner 16 is connected with an input shaft 17 of the transmission 9 in a power transmittable manner. Specifically, a torque converter capable of amplifying the torque is used as the hydraulic transmission mechanism 8.

Accordingly, the hydraulic transmission mechanism 8 will be called a "torque converter" 8 hereinafter for the sake of convenience. In addition, the torque converter 8 is provided with a lockup clutch 18 arranged in parallel with the pump impeller 15 and the turbine runner 16. The lockup clutch 18 is a transmission device adapted to transmit the power between the crank shaft 14 and the input shaft 17 by a frictional force. In order to engage and disengage the lockup clutch 18, the vehicle 1 is provided with a hydraulic control unit 19. Specifically, in case the lockup clutch 18 is engaged, the power is transmitted between the crank shaft 14 and the input shaft 17 by the frictional force. To the contrary, in case the lockup clutch 18 is disengaged, the power is transmitted between the pump impeller 15 and the turbine runner 16 by the kinetic energy of the fluid. Additionally, in case lockup clutch 18 is disengaged, the torque can be amplified by the torque converter 8. On the other hand, the aforementioned transmission 9 is a transmission mechanism capable of changing a ratio between rotational speeds of the input shaft 17 and an output shaft 20, that is, a speed change ratio.

Both of a geared transmission and a continuously variable transmission can be used as the transmission 9. Specifically, the geared transmission is a transmission adapted to change a speed change ratio thereof stepwise (i.e., discontinuously) such as a selective gear transmission, a constant mesh type transmission, a planetary gear type transmission or the like. On the other hand, the continuously variable transmission is capable of varying a speed change ratio thereof steplessly (i.e., continuously) such as a toroidal type continuously variable transmission, a belt type continuously variable transmission or the like. In this example, a geared transmission such as a planetary gear type transmission is used as the transmission 9. Specifically, the transmission 9 comprises a plurality of planetary gear mechanism 21, and a clutch for connecting rotary elements of the planetary gear mechanism 21, or a frictional engagement mechanism 22 such as a brake for allowing the rotary element to be rotated and halting the rotary element. That is, a speed change ratio of the transmission 9 is changed by engaging and disengaging the frictional engagement mechanism 22. According to this example, the frictional engagement mechanism 22 is engaged and disengaged by the hydraulic control unit 19. The transmission 9 is adapted to shift a gear stage thereof among first to four stages under the forward position. Specifically, a speed change ratio of the first stage is larger than that of the second stage, a speed change ratio of the second stage is larger than that of the third stage, and a speed change ratio of the third stage is larger than that of the fourth stage. Further, according to this example, a power transmission route from the output shaft 20 of the transmission 9 to the wheel 3 is formed by a propeller shaft 23, a final reduction mechanism 24 and an axle shaft 25.

In addition, an accelerator pedal 26 to be operated according to an acceleration demand of the driver, a brake pedal (not shown) to be operated according to a deceleration demand of the driver, and a shift lever (not shown) to be operated by a driver to change a range of the speed change ratio are arranged in an interior of the vehicle 1. Specifically, according to this example, the accelerator pedal 26 is adapted to pivot around a support shaft (not shown) within a predetermined angular range when depressed by a foot of the driver, and to stop itself at a predetermined position in case it is not depressed by the driver. On the other hand, in order to establish a reaction force against a pedal force depressing the accelerator pedal 26, there is provided a reaction force generating mechanism 27 which is capable of increasing and decreasing the reaction force according to a depression of the accelerator pedal. Specifically, the reaction force generating mechanism 27 is adapted to increase the reaction force in case the depression of the accelerator pedal 26 is increased, and to decrease the reaction force in case the depressed accelerator pedal 26 is returned toward the predetermined stopping position. In addition, the reaction force generating mechanism 27 is adapted to control the reaction force to be generated exponentially with respect to a change in the depression of the accelerator pedal 26.

For example, a pedal reaction force control device disclosed in Japanese Patent Laid-Open No. 2006-193012 can be used as the reaction force generating mechanism 27 thus capable of controlling the reaction force to be generated. Specifically, according to the teachings of Japanese Patent Laid-Open No. 2006-193012, the pedal reaction force control device comprises: an accelerator pedal, which is pivotal around a support shaft; a reaction force adjusting member, which is connected mechanically with the accelerator pedal, and which is moved linearly by stepping the accelerator pedal; a support member which is also movable linearly; a coiled spring connecting the reaction force adjusting member and the support member; and a rack-and-pinion mechanism for converting a rotational movement of a motor into a linear movement of the support member. Therefore, when a pedal force is applied to the accelerator pedal, the coiled spring is compressed and a reaction force is generated according to the elastic force of the coil spring. The reaction force of the coil spring can be increased by moving the support member toward the reaction force adjusting member by driving the motor. To the contrary, the reaction force of the coil spring is decreased by moving the support member away from the reaction force adjusting member by driving the motor. Thus, the reaction force can be increased and decreased with respect to the change in the depression of the accelerator pedal by adjusting the clearance between the support member and the reaction force adjusting member by driving the motor. Specifically, the reaction force can be controlled exponentially with respect to a change in the depression of the accelerator pedal.

It is also possible to use a device disclosed in Japanese Patent Laid-Open No. 2007-83782 as the reaction force generating mechanism 27. According to the teachings of Japanese Patent Laid-Open No. 2007-83782, an accelerator pedal is attached to a rotary shaft held by a vehicle body, and a DC motor (i.e., a step motor) is attached to the vehicle body. A speed reducer is connected with the DC motor, and a gear of the speed reducer is attached to the rotary shaft in a manner to rotate relatively therewith. The accelerator pedal is connected with the gear through a coil spring. Therefore, when the accelerator pedal is depressed, the coil spring is further twisted and a reaction force is thereby generated. In addition, an end portion of the coil spring can be moved circumferentially by rotating the DC motor by a predetermined degree so that the torsion of the coil spring can be increased and decreased. Thus, the reaction force can be adjusted according to a change in the depression of the accelerator pedal by controlling the rotational angle of the DC motor. Moreover, the reaction force can be controlled exponentially with respect to a change in the depression of the accelerator pedal.

In addition, it is also possible to use a pedal reaction control device disclosed in Japanese Patent Laid-Open No. 2006-176001 as the reaction force generating mechanism 27. The pedal reaction control device taught by Japanese Patent Laid-Open No. 2006-176001 comprises: an accelerator pedal attached to a shaft in a pivotal manner; a return spring attached to the accelerator pedal to return the accelerator pedal to an initial position; an accelerator opening sensor for detecting a rotational angle of the accelerator pedal from the initial position, and a motor connected with the accelerator pedal in a power transmittable manner through a speed reducer. According to the teachings of Japanese Patent Laid-Open No. 2006-176001, the reaction force can be controlled according to an opening degree of the accelerator by controlling the torque of the motor. Moreover, the reaction force can be controlled exponentially with respect to a change in the depression of the accelerator pedal.

Here will be explained a control system of the vehicle 1. As shown in FIG. 3, the vehicle 1 is provided with an electronic control unit 28 as a controller. For example, a signal representing a vehicle speed, a signal from an acceleration sensor 29, a signal representing a rotational speed of the engine 2, a signal representing a shift position, a signal representing an operation of the brake pedal and so on are inputted to the electronic control unit 28. The acceleration sensor 29 is a device for detecting a pedal force applied to the accelerator pedal 26, an operating amount of the accelerator pedal 26, and a velocity to operate the accelerator pedal 26. In addition, a map and data for controlling the output of the engine 2, a map for controlling a speed change ratio of the transmission 9, a map and data for controlling engagement status of the lockup clutch 18, and a map and data for controlling the reaction force generated by the reaction force generating mechanism 27 are stored in the electronic control unit 28. According to this example, the electronic control unit 28 comprises an electronic engine control unit (abbreviated as an engine-ECU) 30 for controlling the engine 2, an electronic motor control unit (abbreviated as a motor-ECU) 31 for controlling the electric motor 7, and an electronic transmission control unit (abbreviated as an AT-ECU) 32 for controlling the transmission 9 and the lockup clutch 18. In the electronic control unit 28, the signals are exchanged mutually among those control units 30 to 32.

According to the vehicle 1 thus structured, a torque is outputted from the engine 2 by burning the fuel, and the torque of the engine 2 is transmitted to the wheel 3 to drive the vehicle 1 through the torque converter 8, the transmission 9, the propeller shaft 23, the final reduction mechanism 24, and the axle shaft 25. When the electricity is supplied to the electric motor 7, torque of the motor generator 7 is also transmitted to the wheel 3 via the same route. That is, the vehicle 1 is a hybrid vehicle in which both of the powers of the engine 2 and the electric motor 7 can be transmitted to the wheel 3. According to this example, therefore, the output of the engine 2, the electric motor 7, the engagement status of the lockup clutch 18, the speed change ratio of the transmission 9 are controlled on the basis of data relating to the depression of the accelerator pedal 26, the vehicle speed, the shift position etc., and on the basis of the maps stored in the electronic control unit 28.

Next, here will be explained an example of controlling the reaction force generated by the reaction force generating mechanism 27 on the basis of depression of the accelerator pedal 26 with reference to the flowchart shown in FIG. 1. Specifically, FIG. 1 is a flowchart explaining a control example for controlling the reaction force against a depression of the accelerator pedal on the basis of an operating amount of the accelerator pedal 26. First of all, a depression of the accelerator pedal 26 is detected by the acceleration sensor 29 (at Step S1), and the detection result is processed by the electronic control unit 28 as an intention of the driver. Specifically, in case the depression of the accelerator pedal 26 is increased, the electronic control unit 28 judges that the driver intends to "increase the vehicle speed", or that the driver intends to "prevent deceleration of the vehicle climbing a hill". That is, in case the depression of the accelerator pedal 26 is increased, the electronic control unit 28 judges that the driver intends to accelerate the vehicle. To the contrary, in case the accelerator pedal 26 is returned toward the predetermined stopping position thereof, the electronic control unit 28 judges that the driver intends to "decrease the vehicle speed", or that the driver intends to "prevent acceleration of the vehicle running down a hill". That is, in case the depression of accelerator pedal 26 is decreased, the electronic control unit 28 judges that the driver does not intend to accelerate the vehicle. Here, a definition of the term "depression" is an angle of the depressed accelerator pedal 26 from the predetermined stopping position thereof, and in this example, the depression of the accelerator pedal 26 is represented by an opening degree θ of the accelerator. In addition, a change in the opening degree θ of the accelerator per unit of time is also obtained at step S1. Then, a reaction force to be generated by the reaction force generating mechanism 27, that is, an amount of change in the reaction force is obtained on the basis of the calculation result of the change in the opening degree θ of the accelerator (at step S2). A process to be carried out at step S2 will be explained later. Then, the reaction force generating mechanism 27 is controlled to vary the reaction force toward the value of the reaction force obtained at step S2 (at step S3), and the routine is returned.

Here will be explained the process to be carried out at step S2 more specifically. In case the opening degree θ of the accelerator is smaller than a predetermined value $θ_0$, a reaction force Fh as a linear function of the opening degree θ of the accelerator is calculated using the following formula (1). To the contrary, in case the opening degree θ of the accelerator is larger than the predetermined value $\theta_0$, the change (i.e., an amount of increase) in the reaction force Fh with respect to the change (i.e., an amount of increase) in the opening degree $\theta$ of the accelerator is obtained in an exponential manner using the following formula (2). Here, the linear function of the formula (1) is connected to the exponential function of the formula (2) continuously at a straight line drawn to define an original point of the opening degree $\theta$ of the accelerator, in other words, drawn through a point where the opening degree $\theta$ of the accelerator is zero. In addition, the formula (1) should not be limited to the linear function. That is, other kinds of functions, in which the reaction force Fh becomes "zero Newton" in case the opening degree $\theta$ of the accelerator is zero, and which is connected to the exponential function of the formula (2) continuously may also be used as the formula (1).

$$Fh = a \cdot \theta \quad (1)$$

$$Fh = F0 \cdot \exp(K1 \cdot \theta) \quad (2)$$

In the above formula (1), "a" is a constant (i.e., of proportionality factor) representing an inclination of the linear function. Next, here will be explained a technical background of the formula (2). The inventor of the present invention have been trying to control an amount of change in the reaction force to be generated by the reaction force generating mechanism 27 with respect to the opening degree $\theta$ of the accelerator changed by the driver of the vehicle 1, in accordance with perceptual characteristic of human being. According to the Weber-Fechner law, the intensity of stimuli perceived by a human being is proportional to a logarithm of physical magnitude of stimuli. Therefore, the reaction force may be controlled with respect to the change in the opening degree of the accelerator in accordance with the perceptual characteristic of human being, by exponentially changing the reaction force as a physical magnitude of the stimulate to be applied to the human being, with respect to the change in the opening degree of the accelerator. That is, uncomfortable feeling of the driver about the reaction force against the accelerator with respect to the operating amount of the accelerator may be mitigated.

The formula (2) has been formulated based on the above technical idea. In the formula (2), "F0" is a constant, specifically, a smallest reaction force which can be perceived by the driver, and "K1" is a constant based on the Weber fraction. Specifically, the Weber fraction is a smallest noticeable difference of a magnitude or behavior of stimuli called "difference threshold". According to the Weber-Fechner law, the smallest noticeable difference $\Delta I$ of the human being with respect to the magnitude of stimuli I is constant as expressed by the following formula:

$$\Delta I/I = \text{constant.}$$

Here, the value of the Weber fraction varies according to a kind of stimulus. Thus, the reaction force to be generated by the reaction force generating mechanism 27 can be changed exponentially according to the change in the opening degree of the accelerator using the above formula (2).

Both of the above-explained formulas (1) and (2) are applied in case the accelerator pedal 26 is depressed. To the contrary, in order to set a hysteresis in case the accelerator pedal 26 is returned toward the predetermined stopping position, in other words, in order to reduce the reaction force Fh of the reaction force generating mechanism 27 exponentially with respect to the change (i.e., decrease) in the opening degree $\theta$ of the accelerator, the following formulas are to be used:

$$Fh = e \cdot \theta \quad (3); \text{ and}$$

$$Fh = F1 \cdot \exp(K1' \cdot \theta) \quad (4).$$

Specifically, the formula (3) is used in case the opening degree of the accelerator is smaller than the predetermined value $\theta_0$, and the formula (4) is used in case the opening degree of the accelerator is larger than the predetermined value $\theta_0$. In the above formula (3), "e" is a constant (i.e., of proportionality factor) representing an inclination of the linear function, and a value of the constant "e" is different from that of the aforementioned constant "a". In the above formula (4), "K1" is a constant based on the Weber fraction, and a value of the constant "K1" is different from that of the aforementioned constant "K1".

Figure 4:
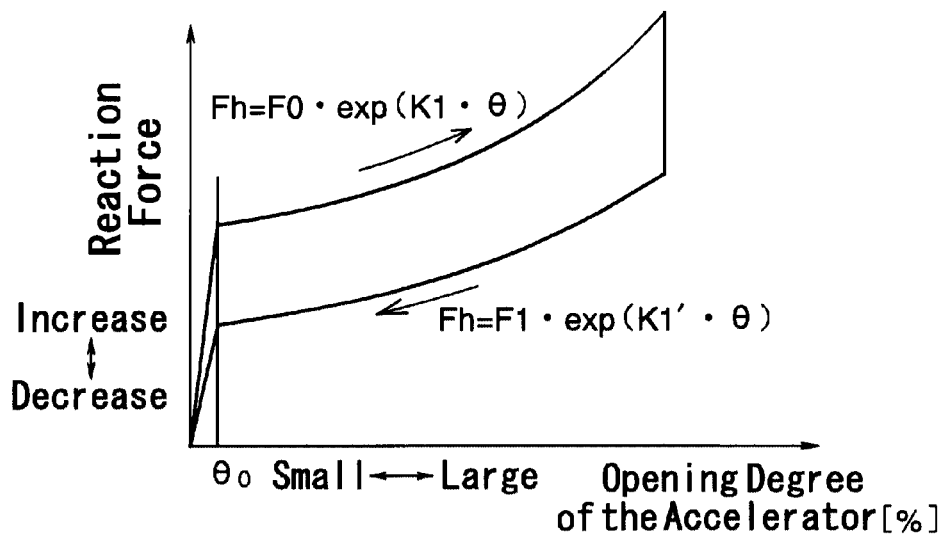
FIG. 4 is a characteristic line showing a relation between a change in an opening degree of an accelerator and a change in a reaction force according to the control shown in FIG. 1.

FIG. 4 is an example of a map showing characteristic line indicating a relation between a change in the opening degree of the accelerator and a change in the reaction force, which is obtained using the above formulas (1) to (4). The above-listed formulas and the map shown in FIG. 4 are stored in the electronic control unit 28. In FIG. 4, the upper line indicates characteristics of the reaction force of the case in which the accelerator pedal 26 is depressed, and the lower line indicates characteristics of the reaction force of the case in which the accelerator pedal 26 is returned. The deference between the upper line and the lower line at a common opening degree of the accelerator is set as a hysteresis.

As a result of thus controlling the reaction force against the depressed accelerator pedal 26, the pedal force applied to the accelerator pedal 26 can be changed exponentially with respect to the opening degree of the accelerator. Such pedal force with respect to the opening degree of the accelerator can be calculated using the following formulas (5) and (6). Specifically, in case the opening degree $\theta$ of the accelerator is smaller than a predetermined value $\theta_0$, the pedal force F as a linear function of the opening degree $\theta$ of the accelerator is calculated using the following formula (5). To the contrary, in case the opening degree $\theta$ of the accelerator is larger than the predetermined value $\theta_0$, the pedal force F as an exponential function of the opening degree $\theta$ of the accelerator is calculated using the following formula (6).

$$F = a \cdot \theta \quad (5)$$

$$F = F0 \cdot \exp(K1 \cdot \theta) \quad (6)$$

Both of the above formulas (5) and (6) are to be used in case the accelerator pedal 26 is depressed. To the contrary, in case the accelerator pedal 26 is returned toward the predetermined stopping position, the pedal force F is changed exponentially with respect to the opening degree 6 of the accelerator as expressed by the following formulas:

$$F = e \cdot \theta \quad (7); \text{ and}$$

$$F = F1 \cdot \exp(K1' \cdot \theta) \quad (8).$$

Specifically, the formula (7) is used in case the opening degree $\theta$ of the accelerator is smaller than the predetermined value $\theta_0$, and the formula (8) is used in case the opening degree $\theta$ of the accelerator is larger than the predetermined value $\theta_0$. The definitions of the signs in the above formulas (5) to (8) are identical to those in the formulas explained previously.

Figure 5:
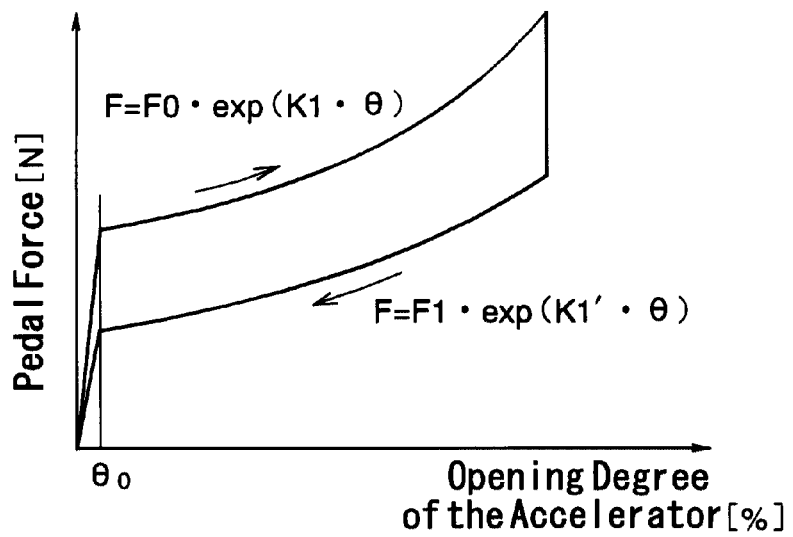
FIG. 5 is a characteristic line showing a relation between a change in an opening degree of the accelerator and a change in a force to depress the accelerator according to the control shown in FIG. 1.

FIG. 5 is an example of a map showing characteristic line indicating a change in the pedal force with respect to the opening degree of the accelerator. In FIG. 5, the upper line indicates characteristics of the pedal force of the case in which the accelerator pedal 26 is depressed, and the lower line indicates characteristics of the pedal force of the case in which the accelerator pedal 26 is returned. Since the hysteresis is set as explained with reference to FIG. 4, the pedal force of the case in which the accelerator pedal 26 is depressed and the pedal force of the case in which the accelerator pedal 26 is depressed are different from each other.

Here will be explained a relation between the example thus has been explained and the present invention. The functional means for carrying out steps S1, S2 and S3 correspond to the reaction force control means of the present invention; the accelerator pedal 26 corresponds to the operating device of the present invention; the engine 2, the electric motor 7, the torque converter 8, the transmission 9 and the lockup clutch 18 correspond to the drive unit of the present invention; and the electronic control unit 28 corresponds to the target driving force determining device and the controller of the present invention. Therefore, the reaction force generated by the reaction force generating mechanism 27 can be controlled exponentially with respect to the change in the opening degree of the accelerator by carrying out the control example shown in FIG. 1. As a result, the feeling of the driver to operate the accelerator pedal 26 according to the depression can be conformed to the perceptual characteristics of the driver. For this reason, an uncomfortable feeling of the driver to operate the accelerator pedal 26 can be mitigated.

Here will be explained a comparative example in which the pedal force is changed linearly on a steady basis. According to the comparative example, the pedal force F can be calculated using the following formulas:

$$F = a \cdot \theta + b \quad (9); \text{ and}$$

$$F = c \cdot \theta + d \quad (10).$$

Figure 6:
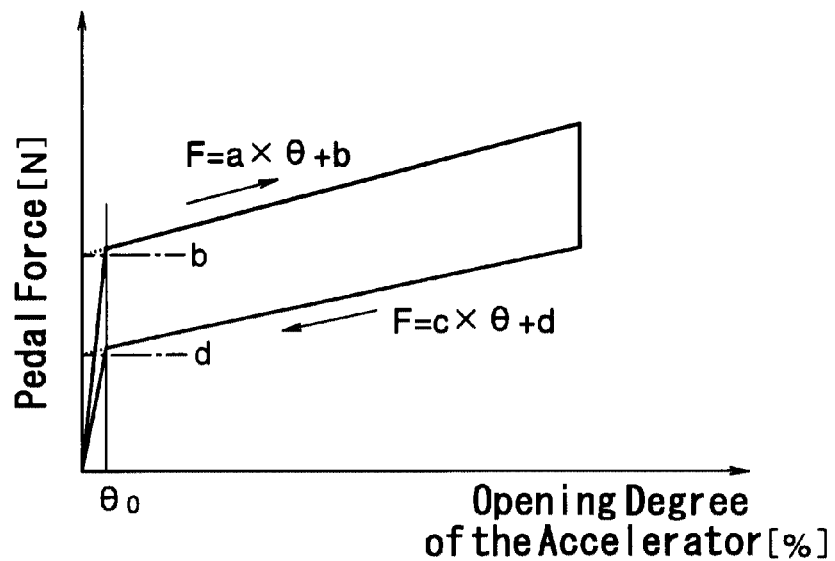
FIG. 6 is a characteristic line showing a relation between a change in an opening degree of the accelerator and a change in a force to depress the accelerator in a comparative example.

In case the accelerator pedal 26 is depressed, the above formula (9) is used to calculate the pedal force F, and in case the accelerator pedal 26 is returned, the above formula (10) is used to calculate the pedal force F. FIG. 6 is a characteristic line showing a relation between an opening degree of the accelerator and the pedal force which is obtained using the formulas (9) and (10). In the formula (9), "b" represents an intercept of the straight line indicating the characteristics of the pedal force F in case the accelerator pedal 26 is depressed within the range where the opening degree $\theta$ of the accelerator is larger than the predetermined opening degree $\theta_0$. On the other hand, in the formula (10), "d" represents an intercept of the straight line indicating the characteristics of the pedal force F in case the accelerator pedal 26 is returned within the range where the opening degree $\theta$ of the accelerator is larger than the predetermined opening degree $\theta_0$. In addition, "a" in the formula (9) and "c" in the formula (10) are constants indicating the inclinations of the linear functions. Unlike the exponential functions shown in FIG. 5, the pedal force is changed linearly in FIG. 6 within the range where the opening degree $\theta$ of the accelerator is larger than $\theta_0$.

Next, here will be explained a control example for mitigating uncomfortable feeling of the driver about an acceleration of the vehicle 1 in an anteroposterior direction by controlling a driving force, with reference to FIG. 7. First of all, a speed of the vehicle 1 and an opening degree $\theta$ of the accelerator are detected or judged (at step S11), and then, a target driving force is calculated (at step S12). Specifically, the control identical to that carried out at the aforementioned step S1 is carried out at step S11. At step S12, the target driving force Fd is calculated using the following formula:

$$Fd = C \cdot (F0 \cdot \exp(K1 \cdot \theta))^{K2} \quad (11)$$

where "Fd" represents the target driving force, "C" represents a constant, and K2 represents an exponent. As indicated by the formula (11), the target driving force Fd is varied exponentially in accordance with a change in the opening degree $\theta$ of the accelerator. Here, the formula (11) can be used in both cases in which the opening degree $\theta$ of the accelerator is increased and decreased. That is, the target driving force is raised in accordance with an increase in the opening degree $\theta$ of the accelerator, and lowered in accordance with a decrease in the opening degree $\theta$ of the accelerator.

Then, an actual driving force of the vehicle 1 is adjusted to the target driving force calculated at step S12 by controlling at least one of the output of the engine 2, the torque of the electric motor 7, the speed change ratio (or gear stage) of the transmission 9, the engagement status of the lockup clutch 18 (at step S13), and the routine is returned. Specifically, the output of the engine 2 can be controlled by controlling at least one of a fuel injection, an ignition timing and an opening degree of the electronic throttle valve 6 (i.e., an air intake). The driving force of the vehicle 1 can be increased by thus raising the output of the engine 2. The actual driving force of the vehicle 1 can also be increased by raising the torque of the electric motor 7. To the contrary, the driving force of the vehicle 1 can be decreased by lowering the output of the engine 2 or the torque of the electric motor 7. In addition, a magnitude to amplify the torque by the transmission 9 can be varied by shifting the gear stage of the transmission 9. Specifically, in case of increasing the driving force, the speed change ratio of the transmission 9 is increased, and in case of decreasing the driving force, the speed change ratio of the transmission 9 is decreased. The driving force can also be increased by disengaging the lockup clutch 18 thereby amplifying the torque by the torque converter 8, and decreased by engaging the lockup clutch 18 thereby preventing the torque converter 8 from amplifying the torque.

A physical quantity of the target driving force thus determined is a perceivable quantity for the driver according to the Weber-Fechner law. Therefore, the actual acceleration of the vehicle 1 in the anteroposterior direction with respect to a change in the opening degree of the accelerator can be changed in accordance with the perception of the human being, by thus determining the target driving force and adjusting the actual acceleration to the determined target driving force at step S13. For this reason, the uncomfortable feeling of the driver about the acceleration of the vehicle 1 can be mitigated. The control example of FIG. 7 is shown schematically in FIG. 8. Specifically, FIG. 8 is a characteristic line (i.e., a map) for varying the target driving force exponentially with respect to a change in the opening degree of the accelerator. As shown in FIG. 8, signals are outputted to the engine-ECU 30, the motor-ECU 31 and the AT-ECU 32 to adjust the actual driving force to the target driving force. In case of carrying out the control shown in FIG. 7, the target driving force can be varied exponentially with respect to the change in the opening degree of the accelerator not only by using the above-explained formulas but also by using the map shown in FIG. 8.

Next, here will be explained a relation between the opening degree of the accelerator and the acceleration of the vehicle 1 more specifically. According to the present invention, a definition of the term "acceleration" is acceleration in an anteroposterior direction, and a relation between sensory acceleration of the driver and the actual acceleration of the vehicle 1 can be expressed by the following formula:

$$G1 = k_1 \log G \quad (12).$$

In case the relation between the sensory acceleration of the driver and a pedal force applied to the accelerator pedal 26 is a linear relation, the sensory acceleration of the driver can be expressed by the following formula:

$$G1 = k_2 \log G \quad (13).$$

Meanwhile, in case the relation between the actual acceleration of the vehicle 1 and the pedal force applied to the accelerator pedal 26 is a linear relation, the actual acceleration of the driver can be expressed by the following formula:

$$G = \exp(k_2 F/k_1) = \exp(KF) \quad (14)$$

In the above formulas (12) to (14), G1 represents the sensory acceleration of the driver, G represents the actual acceleration of the vehicle 1, F represents the pedal force applied to the accelerator pedal 26, and $k_1$ and $k_2$ are constants. As can be seen from the formulas (12) to (14), the sensory acceleration of the driver is expressed in a manner of logarithmic function.

Figure 9:
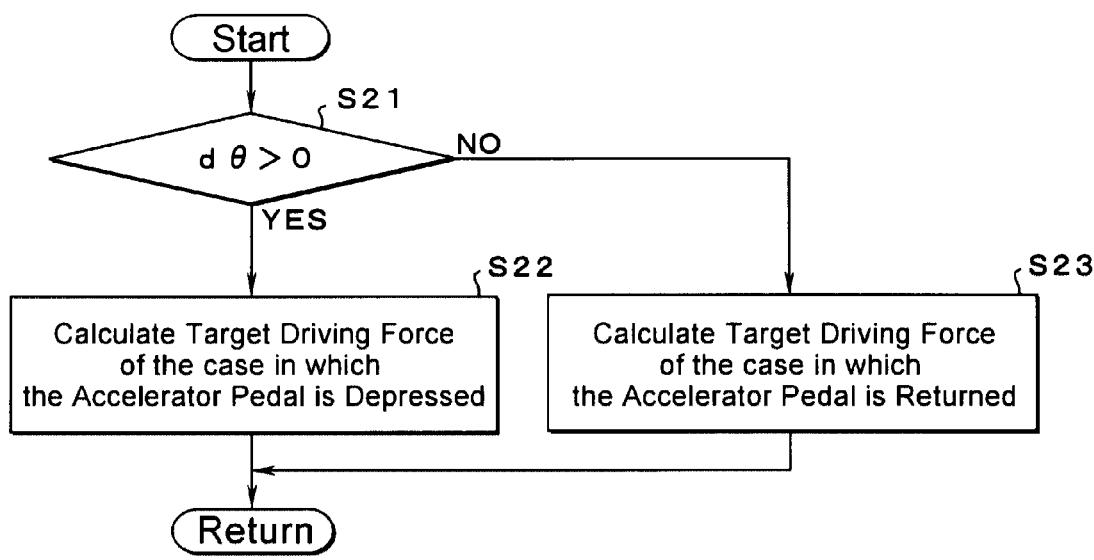
FIG. 9 is a flowchart showing still another control example of the present invention to be carried out in a vehicle.

For the purpose of improving operability of the accelerator pedal 26 and mitigating fatigue degree of the driver to operate the accelerator pedal 26, a hysteresis is set to operate the accelerator 26. Therefore, the driver may feel uncomfortable feeling about the acceleration of the vehicle 1 with respect to the opening degree of the accelerator arising from discrepancy between the case of depressing the accelerator pedal 26 and the case of returning the accelerator pedal 26. A control example for resolving such disadvantage is shown in FIG. 9. Specifically, in FIG. 9, there is shown an control example for calculating the target driving force in a different manner between the case in which the opening degree of the accelerator is increased, and the case in which the opening degree of the accelerator is decreased. In other words, step S12 in FIG. 7 is refined to calculate the target driving force. According to the control example shown in FIG. 9, first of all, it is judged whether or not the opening degree of the accelerator is increased (d θ>0) at step S21. In case the answer of step S21 is YES, the target driving force N of the case in which the accelerator pedal 26 is depressed, that is, the opening degree of the accelerator is increased is calculated (at step S22), and then, the routine is returned. In this case, the target driving force N is calculated using the following formula:

$$N = \exp(KF_{inc}) \quad (15)$$
$$= \exp(K(a \cdot \theta + b))$$

where "K" is a constant; "a" is a proportional constant representing a relation between a pedal force applied to the accelerator pedal 26 and an operating amount of the accelerator pedal 26; and "b" is an intercept coefficient representing a relation between the pedal force applied to the accelerator pedal 26 and the operating amount of the accelerator pedal 26.

To the contrary, in case the answer of step S21 is NO, the target driving force N of the case in which the accelerator pedal 26 is returned, that is, the opening degree of the accelerator is decreased is calculated (at step S23), and then, the routine is returned. In this case, the target driving force N is calculated using the following formula:

$$N = \exp(KF_{dec}) \quad (16)$$
$$= \exp(K(c \cdot \theta + d))$$

where "K" is a constant; "c" is a proportional constant representing a relation between a pedal force applied to the accelerator pedal 26 and an operating amount of the accelerator pedal 26; and "d" is an intercept coefficient representing a relation between the pedal force applied to the accelerator pedal 26 and the operating amount of the accelerator pedal 26.

Figure 10:
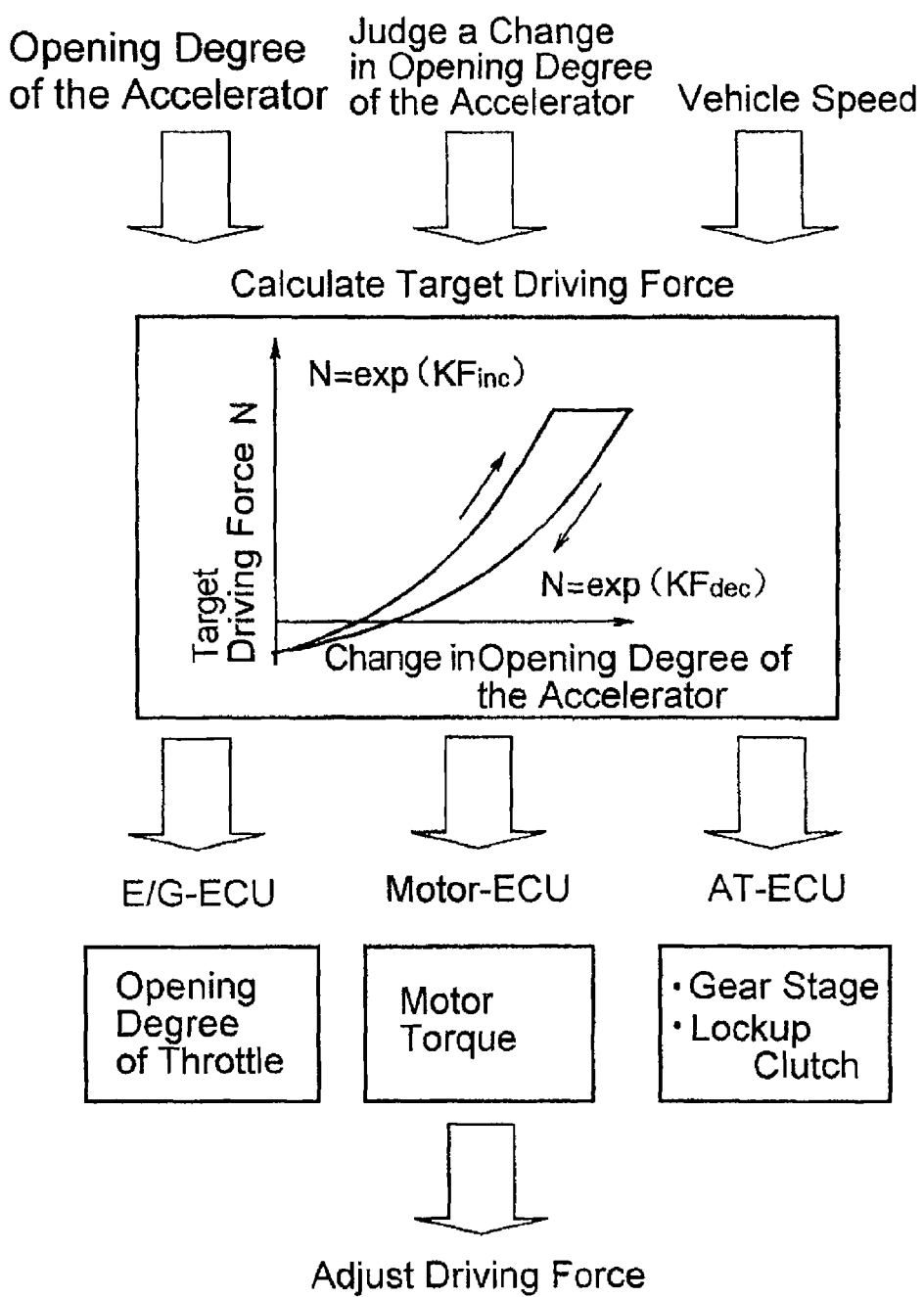
FIG. 10 is a conceptual diagram showing the example shown in FIG. 9 schematically.

Thus, the target driving force N can be calculated in a different manner using different exponential functions between the case in which the accelerator pedal 26 is depressed and the case in which the accelerator pedal 26 is returned. As explained above, the actual driving force is adjusted to the calculated target driving force by controlling the output of the engine 2, the torque of the electric motor 7, the gear stage of the transmission 9, or the engagement status of the lockup clutch 18. The control example of FIG. 9 is shown schematically in FIG. 10. Specifically, FIG. 10 is a characteristic line (i.e., a map) for varying the target driving force (or a drive force demand) exponentially by judging a change in the speed of the vehicle 1 and the opening degree of the accelerator. As shown in FIG. 10, signals are also outputted to the engine-ECU 30, the motor-ECU 31 and the AT-ECU 32 to adjust the actual driving force to the target driving force. In FIG. 10, the upper line indicates characteristics of the target drive force of the case in which the accelerator pedal 26 is depressed, and the lower line indicates characteristics of the target drive force of the case in which the accelerator pedal 26 is returned. The deference between the upper line and the lower line at a common opening degree of the accelerator 26 is set as a hysteresis.

Here, the control shown in FIG. 1 is also feasible by detecting a change in the pedal force applied to the accelerator pedal 26 at step S1 instead of detecting the change in the opening degree of the accelerator, and by varying the reaction force generated by the reaction force generating mechanism 27 exponentially with respect to the change in the pedal force applied to the accelerator pedal 26 at steps S2 and S3. In this case, the reaction force to be generated with respect to the pedal force applied to the accelerator pedal 26 can be obtained indirectly using the maps shown in FIGS. 4 and 5. Alternatively, it is also possible to carry out the control shown in FIG. 1 by detecting the velocity to operate the accelerator pedal 26 at step S1 instead of detecting the change in the opening degree of the accelerator, and by varying the reaction force generated by the reaction force generating mechanism 27 exponentially with respect to the velocity to operate the accelerator pedal 26 at steps S2 and S3. In this case, the reaction force to be generated can be calculated by substituting the velocity to operate the accelerator pedal 26 for the opening degree of the accelerator in the formulas. In addition, the control shown in FIG. 7 is also feasible by detecting a change in the pedal force applied to the accelerator pedal 26 at step S11 instead of detecting the change in the opening degree of the accelerator, and by varying the target driving force exponentially at steps S21 and S13. In this case, the target driving force to be generated with respect to the pedal force applied to the accelerator pedal 26 can be obtained indirectly using the maps shown in FIGS. 5 and 8.

Figure 7:
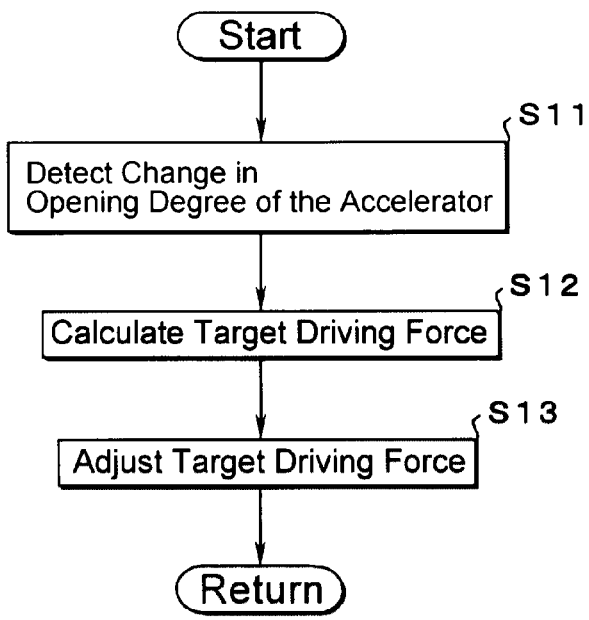
FIG. 7 is a flowchart showing another control example of the present invention to be carried out in a vehicle.
Figure 8:
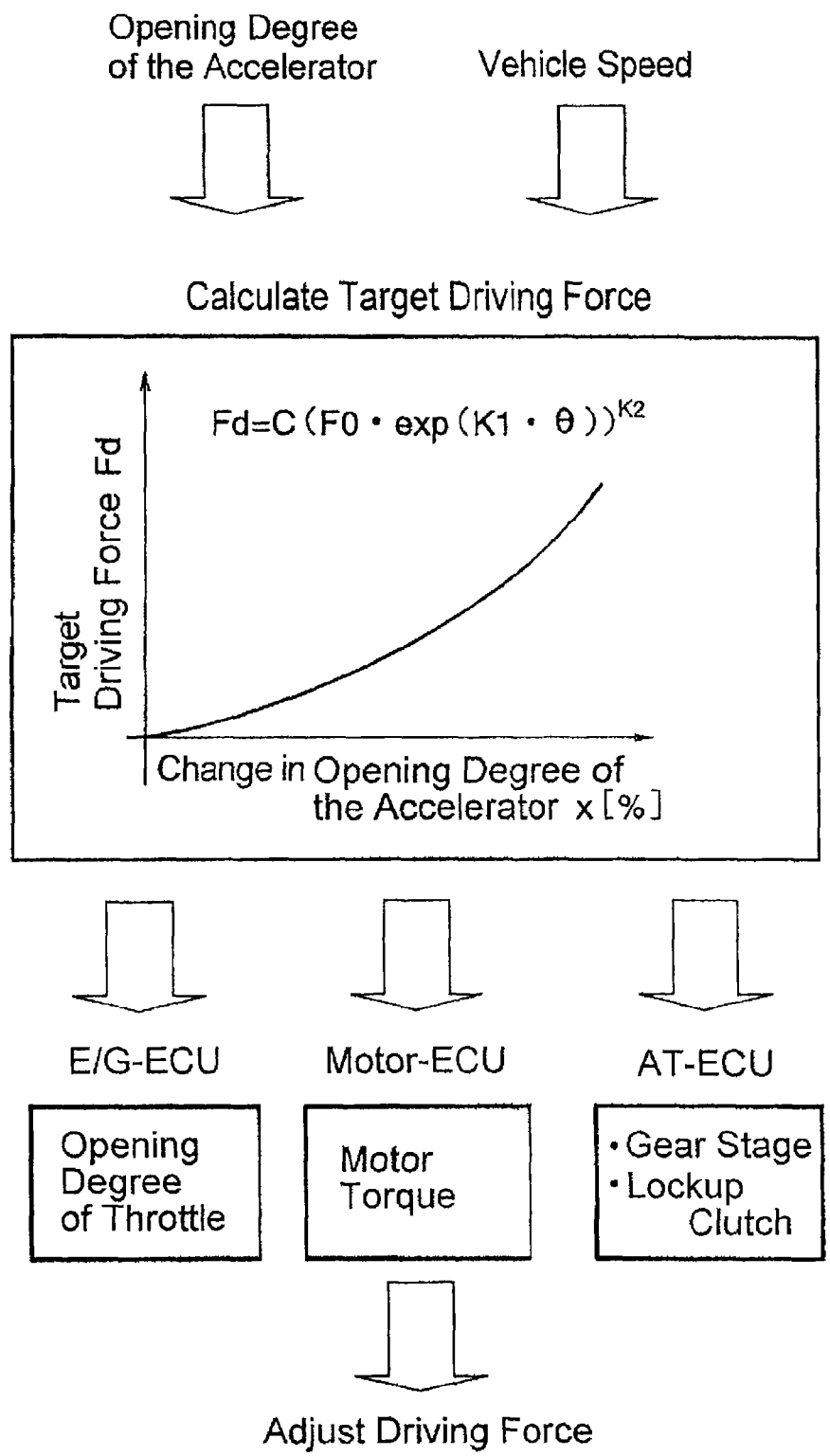
FIG. 8 is a conceptual diagram showing the example shown in FIG. 7 schematically.

Alternatively, it is also possible to carry out the control shown in FIG. 7 by detecting the velocity to operate the accelerator pedal 26 at step S11 instead of detecting the change in the opening degree of the accelerator, and by varying the reaction force generated by the reaction force generating mechanism 27 exponentially with respect to the velocity to operate the accelerator pedal 26 at steps S12 and S13. In this case, the reaction force to be generated can be calculated by substituting the velocity to operate the accelerator pedal 26 for the opening degree of the accelerator in the formulas. Further, the control shown in FIG. 9 is also feasible by judging whether the pedal force is being increased or being decreased at step S21, and advancing the routine to step S22 in case the pedal force is being increased and advancing the routine to step S23 in case the pedal force is being decreased. In this case, the target driving force with respect to the pedal force can be obtained indirectly based on the change in the pedal force using FIGS. 5 and 10. Alternatively, it is also possible to carry out the control shown in FIG. 9 by judging whether the velocity to operate the accelerator pedal 26 is being increased or being decreased at step S21, and advancing the routine to step S22 in case the velocity to operate the accelerator pedal 26 is being increased and advancing the routine to step S23 in case the velocity to operate the accelerator pedal 26 is being decreased. Thus, according to the present invention, the reaction force and the target driving force are also varied exponentially even in case of carrying out the above-explained controls by detecting the "change in pedal force applied to the accelerator pedal 26" or the "velocity to operate the accelerator pedal 26", instead of detecting the "change in opening degree θ of the accelerator". Therefore, step S1 in FIG. 1 and step S11 in FIG. 7 may also be called as an "operating state detecting means" for detecting a status of the accelerator pedal 26 corresponding to the operating device of the present invention.

The control examples shown in FIGS. 1 and 7 may be carried out not only separately but also simultaneously. In case of carrying out the controls shown in FIGS. 1 and 7 simultaneously, both of the target driving force and the reaction force are varied exponentially with respect to the change in the opening degree of the accelerator. Therefore, the uncomfortable feeling of the driver can be mitigated more certainly. Here, in case of carrying out the controls, the reaction force and the target driving force may be obtained not only by using the formulas in real time but also by using the maps stored in the electronic control unit 28 in advance. In addition, although the constant according to the Weber-Fechner law is used as the constant "K" in the control examples thus have been explained, a constant according to the Stevens' power low may also be used as the constant "K". Specifically, according to the Stevens' power low, perceived intensity E is a power function of a magnitude of a physical stimulus I as expressed by the following formula:

$$E = KI^n \tag{17}$$

In this case, the constant "K" can be calculated by selecting an appropriate exponent from the exponents according to the Stevens' power low. The advantage to be achieved in case of using the Weber-Fechner law can also be achieved even in case of thus using the Stevens' power low.

In addition, although the vehicle 1 shown in FIGS. 2 and 3 is a two-wheel drive car in which the powers of the engine 2 and the electric motor 7 are transmitted to the (rear) wheels, the present invention may also be applied to a two-wheel drive car in which the powers of the engine 2 and the electric motor 7 are transmitted to front wheels, and to a four-wheel drive car in which the powers of the engine 2 and the electric motor 7 are transmitted to both front and rear wheels. Moreover, the present invention may also be applied to a vehicle provided with only one of the engine and the electric motor. Furthermore, the present invention may also be applied to a vehicle provided with an actuator for controlling the lockup clutch and the transmission by an electromotive force.

Lastly, according to the example thus has been explained, the sensors are adapted to output signals in accordance with the operating status of the accelerator pedal 26. The signal outputted from the sensors are processed by the electronic control unit 28 and outputted from the electronic control unit 28 thereby controlling the reaction force to be generated by the reaction force generating mechanism 27 exponentially. However, it is also possible to control the reaction force to be generated by the reaction force generating mechanism 27 exponentially without using the sensors for detecting the operating status of the accelerator pedal 26 electrically, electromagnetically or photoelectrically, and without using the electronic control unit 28. For example, in case the reaction force generating mechanism is adapted to generate the reaction force by a compressed coil spring, the reaction force to be generated by the reaction force generating mechanism can be varied exponentially with respect to a change in the force applied to the accelerator pedal 26, a change in an opening degree of the accelerator, or the velocity to operate the accelerator pedal 26, by setting a mechanical characteristics of the oil spring such as a constant of the coil spring, a number of the coil spring, a stroke of the coil spring and so on to vary the reaction force to be generated.

The invention claimed is:

1. A driving force controlling system, which has a drive unit for generating a driving force for driving a vehicle, an operating device operated by a driver of the vehicle, a target driving force determining device for determining a target driving force of the vehicle on the basis of a change in a force applied to the operating device to operate the operating device, a change in an operating amount of the operating device, or a velocity to operate the operating device, and a controller for controlling the driving force generated by the drive unit on the basis of the determined target driving force, comprising:

a target driving force calculating means that varies exponentially the target driving force determined by the target driving force determining device, based on an increase in the change in the force applied to the operating device to operate the operating device, the change in an operating amount of the operating device, or the velocity to operate the operating device.

2. The driving force controlling system as claimed in claim 1, wherein:

the target driving force calculating means includes a means which varies the target driving force using different exponent functions depending on a situation, between a case in which the force applied to the operating device to operate the operating device is being increased, and a case in which the force applied to the operating device to operate the operating device is being decreased.

3. The driving force controlling system as claimed claim 1, wherein:

the target driving force calculating means includes a means which varies the target driving force using different exponent functions depending on a situation, between a case in which the operating amount of the operating device is being increased, and a case in which the operating amount of the operating device is being decreased.

4. The driving force controlling system as claimed claim 1, wherein:

the target driving force calculating means includes a means which varies the target driving force using different exponent functions depending on a situation, between a case in which the velocity to operate the operating device is relatively high, and a case in which the velocity to operate the operating device is relatively low.

* * * * *